United States Patent Office 3,099,675
Patented July 30, 1963

3,099,675
O-ALKYL O-ETHYNYLCYCLOALKYL PHOSPHOR-AMIDATES AND PHOSPHORAMIDOTHIOATES
Herman O. Senkbeil, Midland, Mich., assignor to The Dow Chemical Company, Midland, Mich., a corporation of Delaware
No Drawing. Filed July 6, 1961, Ser. No. 122,099
6 Claims. (Cl. 260—461)

The present invention is directed to the phosphoramidates and phosphoramidothioates corresponding to the formula

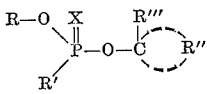

In this and succeeding formulae, R represents lower alkyl, R' represents amino or lower alkyl amino, R" represents a polymethylene radical containing from 4 to 5 carbon atoms, inclusive, R''' represents ethynyl or 1-propynyl and X represents oxygen or sulfur. In the present specification and claims, the expression "lower alkyl" is employed to refer to radicals containing from 1 to 5 carbon atoms, inclusive. These compounds are liquid materials which are somewhat soluble in many common organic solvents and which have low solubilities in water. The compounds are useful as herbicides and parasiticides and are adapted to be employed for the control of many mites, insects, plants and bacterial and fungal organisms such as beetles, ticks, aphids, worms, brome grass and pigweed.

The novel compounds of the present invention are prepared by reacting a phosphoramidochloridate or phosphoramidochloridothioate corresponding to the formula

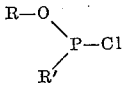

with an alkali metal salt of a 1-alkynylcycloalkanol corresponding to the formula

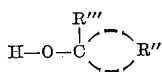

The reaction conveniently is carried out in an inert organic liquid such as benzene, toluene, carbon tetrachloride, methylene chloride and diethyl ether. The amounts of the reagents to be employed are not critical, some of the desired product being obtained when employing any proportion of the reagents. In the preferred method of the operation, good results are obtained when employing substantially equimolecular proportions of the alkali metal salt of the 1-alkynylcycloalkanol and phosphoramidochloridate or phosphoramidochloridothioate. The reaction takes place smoothly at the temperature range of from 0° to 75° C. with the production of the desired product and chloride of reaction. This chloride appears in the reaction mixture as alkali metal chloride. In carrying out the reaction, the reactants are mixed and contacted together in any convenient manner and the resulting mixture maintained for a period of time in the reaction temperature range to insure completion of the reaction. Following the reaction, the reaction mixture is filtered and the reaction medium removed from the filtrate by evaporation or distillation under reduced pressure to obtain the desired product as a liquid residue.

The following examples merely illustrate the invention and are not to be construed as limiting:

EXAMPLE 1

*O-(1-Ethynylcyclohexyl) O-Butyl Phosphoroamidothioate*

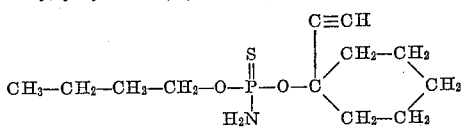

1-ethynylcyclohexanol (18.6 grams; 0.15 mole) is added portionwise with stirring to 3.5 grams of sodium dispersed in 200 milliliters of benzene to produce the sodium salt of 1-ethynylcyclohexanol. The addition is carried out at a temperature of from 37° to 45° C. and over a period of about 2 hours. O-butyl phosphoramido-chloridothioate (28.2 grams; 0.15 mole) is added portionwise to the above prepared dispersion containing the sodium salt of 1-ethynylcyclohexanol. The addition is carried out over a period of about 40 minutes and at a temperature of from 20° to 30° C. Stirring is thereafter continued over a period of 3½ hours as the temperature of the reaction mixture reaches room temperature. The reaction mixture is thereafter filtered and the reaction medium removed from the filtrate by evaporation under reduced pressure to obtain an O-(1-ethynylcyclohexyl) O-butyl phosphoramidothioate product as a liquid residue. This product has a refractive index $n/D$ of 1.503 at 25° C. and a phosphorus content of 11 percent as compared to a theoretical content of 11.28 percent.

EXAMPLE 2

*O-(1-Ethynylcyclopentyl) O-Methyl N-Methyl Phosphoramidate*

1-ethynylcyclopentanol (22 grams; 0.2 mole) is added portionwise with stirring to 0.2 mole of sodium dispersed in 250 milliliters of benzene to produce a benzene dispersion of the sodium salt of 1-ethynylcyclopentanol. The addition is carried out over a period of one hour and at a temperature of 35° to 40° C. O-methyl N-methyl phosphoramidochloridate (28.7 grams; 0.2 mole) is added portionwise with stirring to the above prepared dispersion of the salt product. The addition is carried out over a period of one hour and at a temperature of 25° C. Following the addition, the reaction mixture is filtered and the reaction medium removed from the filtrate by evaporation under reduced pressure to obtain an O-(1-ethynylcyclopentyl) O-methyl N-methyl phosphoramidate product as a liquid residue having a molecular weight of 216 and a phosphor content of 14 percent.

EXAMPLE 3

*O-[1-(1'-Propynyl)-Cyclohexyl] O-Amyl N-Butyl Phosphoramidothioate*

1-propynylcyclohexanol (27.6 grams; 0.2 mole) is added portionwise with stirring to 4.6 grams (0.2 mole) of sodium dispersed in 250 milliliters of benzene to produce the sodium salt of 1-propynylcyclohexanol. O-amyl N-butyl phosphorochloridothioate (51.4 grams; 0.2 mole) is added portionwise with stirring to the above prepared salt dispersion. The addition is carried out over a period of one hour and at a temperature of 30° to 40° C. Following the addition, the reaction mixture is allowed to come to room temperature and filtered and the filtrate thereafter concentrated by evaporation under vacuum. As a result of these operations, theer is obtained an O-[1-(1'-propynyl)-cyclohexyl] O-amyl N-butyl phosphoramidothioate product as a liquid residue having a molecular weight of 359 and a sulfur content of 8.9 percent.

In a similar manner, other products of the present invention are prepared as follows:
O-(1-ethynylcyclopentyl) O-butyl N-amyl phosphoramidothioate (molecular weight of 330; phosphorus content of 9.2 percent) by reacting together the potassium salt of 1-ethynylcyclopentanol and O-butyl N-amyl phosphoramidochloridothioate.

O-[1-(1'-propynyl)-cyclopentyl] O - ethyl N - dimethyl phosphoramidate (molecular weight of 260; phosphorus content of 12 percent) by reacting together the sodium salt of 1-propynylcyclopentanol and O-ethyl N-dimethyl phosphoramidochloridate.

O-[1-(1' - propynyl)-cyclohexyl] O - propyl N - dibutyl phosphoramidate (molecular weight of 370; phosphorus content of 8.1 percent) by reacting together the sodium salt of 1-propynylcyclohexanol and O-propyl N-dibutyl phosphoramidochloridate.

O-[1-(1' - propynyl) - cyclopentyl] O - propyl N - ethyl phosphoramidothioate (molecular weight of 287; sulfur content of 11 percent) by reacting together the sodium salt of 1-propynylcyclopentanol and O-propyl N-ethyl phosphoramidochloridothioate.

O-[1-(1' - ethynyl) - cyclohexyl] O - methyl N - methyl phosphoramidothioate (molecular weight of 247; sulfur content of 16; phosphorus content of 15.1) by reacting together the sodium salt of 1-(1'-ethynyl)-cyclohexanol and O-methyl N-methyl phosphoramidochloridothioate.

The new compounds of the present invention are useful as herbicides and parasiticides for the control of a number of the plant and parasite species. For such use, the products are dispersed on a finely divided solid and employed as dusts. Also, such mixtures may be dispersed in water with or without the aid of a surface dispersing agent and the resulting aqueous suspensions employed as sprays. In other procedures, the products are employed as toxic constituents of solvent solutions, oil-in-water or water-in-oil emulsions or aqueous dispersions. In representative operations, aqueous compositions containing 500 parts per million by weight of O-(1-ethynylcyclohexyl) O-methyl N-methyl phosphoramidothioate give complete controls of Mexican bean beetles and mites. In additional operations, the application of O-(1-ethynylcyclohexyl) O-butyl phosphoramidothioate to soil at a dosage of 50 pounds per acre gives complete kills of pigweeds.

The O-alkyl phosphoramidochloridates and phosphoramidochloridothioates employed as starting materials in accordance with the teaching of the present specification are prepared in known procedures by reacting an O-alkyl phosphorodichloridate or phosphorodichloridothioate with ammonia or a lower alkyl amine. Good results are obtained when operating at temperatures of from 10° to 60° C. and employing 1 molecular proportion of the phosphorodichloridate or phosphorodichloridothioate with about 2 molecular proportions of ammonia or lower alkyl amine. The reaction takes place smoothly and conveniently in an inert organic solvent as reaction medium with the production of the desired starting material and chloride of reaction. Upon completion of the reaction, the starting material is separated by conventional methods.

The alkynylcycloalkanols employed as starting materials in accordance with the present invention are prepared in accordance with known procedures wherein cyclohexanone or cyclopentanone is reacted with sodium acetylide or sodium methylacetylide to obtain the sodium salt of the desired alkynylcycloalkanol. The salt compound can be hydrolyzed with sulfuric acid to obtain the alkynylcycloalkanol.

I claim:

1. A compound corresponding to the formula

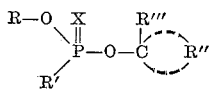

wherein R represents lower alkyl, R' represents a member of the group consisting of amido, monolower alkyl amido and dilower alkyl amido, R'' represents a polymethylene radical containing from 4 to 5 carbon atoms, inclusive, R''' represents a member of the group consisting of ethynyl and 1-propynyl and X represents a member of the group consisting of oxygen and sulfur.

2. O-(1 - ethynylcyclohexyl) O - butyl phosphoramidothioate.

3. O-(1-ethynylcyclopentyl) O-methyl N-methyl phosphoramidate.

4. O-[1-(1'-propynyl) - cyclohexyl] O - amyl N - butyl phosphoramidothioate.

5. O-(1-ethynylcyclohexyl) O-methyl N-methyl phosphoramidothioate.

6. O-[1-(1'-propynyl)-cyclopentyl] O-ethyl N-dimethyl phosphoramidate.

References Cited in the file of this patent

UNITED STATES PATENTS

| | | |
|---|---|---|
| 2,894,019 | Maeder | July 7, 1959 |
| 2,993,864 | Monroe et al. | July 25, 1961 |